Figure 1:
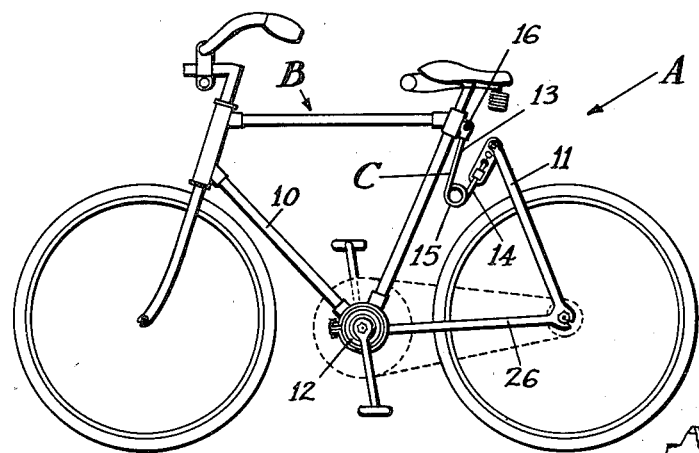

Aug. 10, 1948.  J. R. WHELER  2,446,731
BICYCLE
Filed Dec. 8, 1945

INVENTOR
J. R. WHELER
By: Fetherstonhaugh & Co.
ATT'YS

Patented Aug. 10, 1948

2,446,731

UNITED STATES PATENT OFFICE 2,446,731

BICYCLE

John Ross Wheler, Toronto, Ontario, Canada

Application December 8, 1945, Serial No. 633,637

1 Claim. (Cl. 280—284)

This invention relates to improvements in bicycles and more particularly to bicycle frames.

In the average bicycle the frame is built as sturdily as possible in a rigid unit, with the result that any appreciable shock absorbing action must be left to the spring mounting of the seat. As a result of this, therefore, the average cyclist is subjected to substantial vibration and jolt, particularly where the bicycle is travelling over uneven ground or has to pass over sections of roadway or the like which must necessarily be of somewhat rough character, such as railway crossings, street-car tracks, cobble stones, etc.

There have been some proposals made with a view to absorbing some of this very undesirable shock and it was proposed many years ago to permit the rear portion of the frame to move as between spring constructions at the top and bottom of the frame. However, relative movement of the rearward part of the frame caused in this manner had the effect of shortening the distance between the driving sprocket and the rear wheel sprocket such that the chain of the bicycle became dislodged frequently from its mounting.

The disadvantages of the prior art are readily overcome by the present invention. It is a main object of the present invention to provide a bicycle frame wherein a rearward portion thereof is capable of relative movement to the forward portion of the frame, thus to absorb to a maximum degree resulting shock as the bicycle is travelling over any rough portion of a roadway or the like and wherein such relative movement will not have any disadvantageous effect on the operating parts of the bicycle.

A further object of the invention is to provide a particularly simple shock absorbing means which is most effective and through which a portion of the rear of the frame of the bicycle is caused in effect to swing relatively to the central hub thereof with spring means to absorb the effect of this movement and prevent its transmittal in any appreciable degree to the frame of the bicycle as a whole and consequently to the rider thereof.

A still further object of the invention is to provide a device of this kind wherein the parts may be assembled in a very simple manner, thus to provide a structure which can be manufactured economically.

A still further object of the invention is to provide a development of this kind wherein the degree of spring shock absorption may be varied in a very simple maner.

A still further object of the invention is to provide a development of this kind wherein the structure is particularly sturdy, thus to withstand all normal stress and strain to which a bicycle may be subjected and which may be produced in varied simple forms which are easy of maintenance.

With these and other objects in view, the invention generally comprises a bicycle frame having the forward section designed operatively to connect with the front wheel and a rear frame section designed operatively to connect with the rear wheel of the bicycle, the rear frame section being movable relatively to the forward frame section and capable of swinging movement about the main hub of the frame and including a spring means for absorbing shock incident to the relative movement of the rear section of the frame.

The invention will be clearly understood by reference to the following detailed specification taken in conjunction with the accompanying drawings.

In the drawings—

Fig. 1 is a side elevation of a bicycle incorporating the improvements of the present invention.

Figure 2:
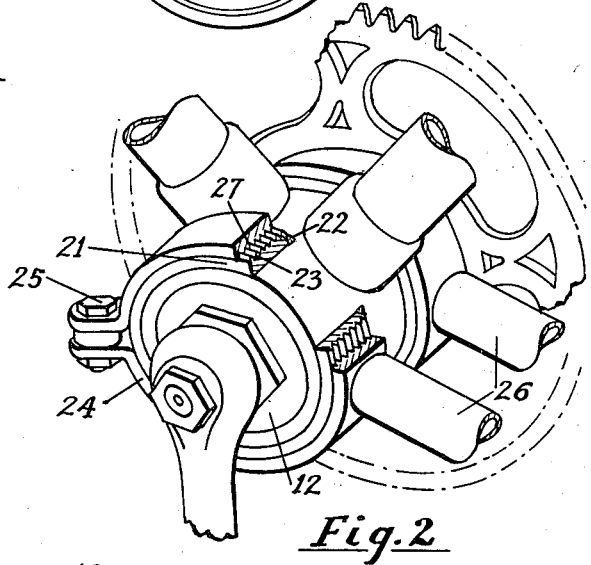
Figure 3:
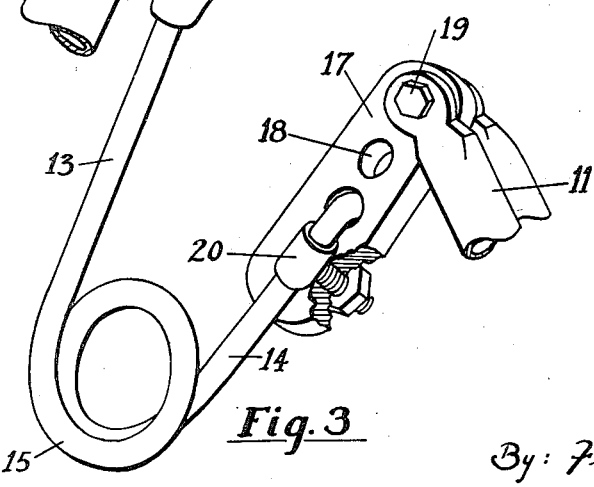

Fig. 2 is an enlarged fragmentary perspective detail of the main hub of the bicycle frame to illustrate the manner in which the rear section of the bicycle frame is mounted to move relatively to the forward section of the frame; and Fig. 3 is an enlarged fragmentary perspective of one form of spring means which may be incorporated between the movable rear section of the frame and forward section of the frame to absorb shock occasioning the movement of the rear section of the frame.

Referring to the drawings, A indicates a bicycle as a whole which includes a frame B incorporating a forward frame section 10 and a rearward frame section 11. According to the present invention, the rearward frame section 11 is mounted in such a manner as to move relatively to the forward frame section as a result of shock imparted to the bicycle as it is travelling. The rearward frame section is swingably mounted from the main hub 12 of the frame so that in effect it will oscillate with the centre of the hub 12 as the centre of oscillation. This swinging mounting may take one of several practical forms, one of which will be described hereinafter.

The upper portion of the rear frame section 11 is designed to connect with the forward frame section by a suitable spring means C. One practical form of spring connection is as illustrated and embodies a bow-spring having the opposed arms 13 and 14 which may be coiled at one end as at 15. The upper end of the arm 13 is pivotally connected as at 16 to the forward section of the frame 10 just below and rearwardly of the seat mounting, while the upper end of the arm 14 which preferably is shorter is connected to an adjusting bracket 17 which may take the form of a link having a series of orifices 18 therein pivotally mounted as at 19 to the upper portion of the rear section 11 and rigidly connected by means of any suitable adjusting connection 20 with the upper end of arm 14. Accordingly, therefore, when the bicycle travels over rough surfaces, it will be obvious that the rear section 11 of the frame will be caused to oscillate as a result of the rear wheel and also the forward wheel of the bicycle encountering such rough surface. Accordingly, therefore, as section 11 moves relatively to section 10, the movement will be absorbed by the spring connections C which, as a result, will absorb shocks that normally would be imparted to the bicycle frame were it of normally rigid character.

It will be particularly observed that since the rear section 11 is swingably mounted with the centre of hub 12 as the centre of oscillation, the distance between the centre of the driving sprocket of the bicycle and the centre of the driven sprocket on the rear wheel will never be changed. Consequently, the drive chain will always be maintained in normal condition and will not have any tendency to jump its sprocket such as in the case where the chain was slackened. Accordingly, therefore, the present development provides for the practical shock absorbing movement of a section of the frame without in any way altering the operating characteristics of the bicycle.

A practical form of swingably mounting the rear section 11 of the frame is readily illustrated in Fig. 2. In this form of construction the projecting end of the hub 12 is fitted with a ring-like element 21 which is rigidly secured thereto such as by welding 22. The element 21 is provided with a plurality of parallel ribs 23 on its exposed face. Cooperating with the element 21 is a fitting 24 of ring-like character preferably in the form of a split fitting, the parts of which may be secured together such as by a bolt 25. The fitting 24 is carried on each end of the lower bars 26 of the rear frame section 11. The internal face of the fitting 24 is provided with a plurality of corresponding grooves 27 which are designed to fit over the ribs 23. Thus, the lower bars 26 of the rear section 11 of the frame are in effect swingably mounted on the hub 12 and thereby are permitted to oscillate as previously described in order to cause vibrational shock to be absorbed readily by the spring means C.

It is apparent, of course, that any suitable connection may be effected between the lower bars 26 and the hub 12 in a manner to permit an oscillating action of the rear section of the frame, and preferably this means includes a fastening so that the frictional engagement between the fitting carried by the bars 26 and the hub may be varied if necessary.

It will be apparent from the foregoing that the present invention will permit of the movement of the rear section 11 of the frame independently of the complete frame in a manner to absorb through its spring connection undesirable vibratory shocks imparted to the frame by a rough road bed, etc., and that the construction is such as to obviate the impairment or dislocation of other parts of the bicycle mechanism.

What I claim as my invention is:

A bicycle frame comprising a frame body including a forward frame section designed operatively to connect with a front wheel, a main hub carried thereby for mounting the bicycle pedal shaft, a rear wheel, lower parallel arms connecting between the main hub and said rear wheel, said arms each being provided with a ring-like element designed to encircle the main hub of the frame in swingable relation thereto, said hub and said ring-like elements being provided with mating rib and groove elements to maintain said elements in movably mounted position on said hub, said arms being swingably mounted and having a centre of swing substantially coincident with the centre of said hub, means extending upwardly from said arms and said rear wheel, and spring means in connection with the upper extremity of said latter means and the upper portion of the front frame section substantially to obviate imparting shock to the front frame section caused by the swingable movement of said arms and said rear wheel about said hub.

JOHN ROSS WHELER.

REFERENCES CITED

The following references are of record in the file of this patent:

UNITED STATES PATENTS

| Number | Name | Date |
|---|---|---|
| 467,794 | Ellis | Jan. 26, 1892 |
| 513,367 | Parsons | Jan. 23, 1894 |
| 644,788 | Williams | Mar. 6, 1900 |
| 1,064,697 | Bamford | June 17, 1913 |